United States Patent Office 3,092,612
Patented June 4, 1963

3,092,612
COPOLYMERS PREPARATION PROCESS
Henry S. Makowski, Carteret, N.J., assignor to Esso Research and Engineering Company, a corporation of Delaware
No Drawing. Filed May 29, 1959, Ser. No. 816,696
2 Claims. (Cl. 260—88.2)

This invention relates to a process for preparing halogenated copolymers and particularly to a process for the prevention of gellation in the preparation of halogenated copolymers of ethylene and a higher alpha olefin.

A process for the preparation of halogenated amorphous rubbery copolymers of ethylene and higher alpha olefins which are suitable, when cured, as synthetic rubbers has been described and claimed in copending application Serial No. 725,513 filed April 1, 1958. The process of this copending application involves the steps of first copolymerizing ethylene and a higher alpha olefin in contact with a low-pressure polymerization catalyst in an inert diluent, inactivating or removing the polymerization catalyst, treating the polymerization mixture with a halogenating agent, and isolating the resulting halogenated copolymer.

It was found, however, that when the halogenation step was performed in the presence of certain metal-containing materials, gelling (due to cross-linking) and/or severe degradation of the halogenated copolymer occurred under the conditions of the halogenation reaction. Iron salts were found to be particularly bad in causing gelling. Since it is highly desirable for economic reasons to carry out the preparation of halogenated amorphous rubbery copolymers of ethylene and higher alpha olefins in iron or steel containers, it was necessary to discover chemical agents which prevent gelation and/or degradation in the presence of iron and other metal salts. It was surprisingly found that certain amines, organic phosphorus-containing salts, and sulfur-containing rubber accelerators inhibited both cross-linking and degradation in the presence of metal-containing materials. When the term "inhibiting agent" is used in the specification and claims, it is to be understood to mean a chemical which inhibits cross-linking and/or degradation of the copolymer in the halogenation step of the present invention.

The amines suitable for use in the present invention for the prevention of cross-linking and/or copolymer degradation are tertiary amines, amino alcohols such as triethanolamine, hexamethylene tetramine, trialkylamines such as trimethylamine, triethylamine and the like, and nitrogen heterocyclics such as pyridine and the quinolines and their substituted derivatives. The organic phosphorus-containing salts are organic phosphates and phosphites, such as for example triethylphosphate and triethylphosphite. The sulfur-containing rubber accelerators useful herein are known accelerators such as the tetraalkyl thiuram sulfides, for example tetramethyl thiuram disulfide and pentamethylene thiuram tetrasulfide; dialkyl carbamates of the general formula

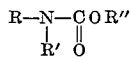

and dialkyl dithiocarbamates of the general formula

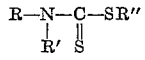

In both of these formulas R, R' and R" are alkyl groups. R can be the same as or different from R', which in turn can be the same as or different from R". These rubber accelerator inhibiting agents are further desirable in that they are relatively non-volatile and therefore at least a portion thereof remains in the polymer product, thus obviating the necessity for the addition of other stabilizers for shelf life storage. The above inhibiting agents can be used individually or in any desired combination.

The metal-containing materials found to cause cross-linking are iron metal and iron salts such as $FeCl_3$ and $Fe_2O_3$. It was found that nickel and chromium metals and their oxides and chlorides do not cause severe copolymer gellation with concentrations normally encountered during chlorination of polyolefins in stainless steel reactors. Higher concentrations of these compounds, if present, are effectively inhibited by the inhibiting agents of the invention.

The quantity of inhibitor introduced will depend on the activity of the inhibitor and the quantity of metal salts present. Generally, however, from 0.1 to 6 g./l., preferably 0.2 to 1 g./l. of inhibitor is added based on the volume of polymer solution.

The inhibitor is added at the beginning of the halogenation reaction described in copending application 725,513 which is incorporated herein in its entirety. However, to make the present application self-sufficient, the process of copending application 725,513 will be described briefly. Ethylene and a higher alpha olefin are copolymerized in an inert hydrocarbon diluent with from 15 to 85 mol. percent, preferably 40 to 60 mol. percent ethylene and 85 to 15 mol. percent, preferably 60 to 40 mol. percent of an alpha olefin containing from 3 to 6 carbon atoms at pressures ranging from atmospheric to 15 atmospheres with a catalyst concentration of 0.1 to 5 g./l., preferably 1 g./l. The polymerization temperature is not critical although temperatures in the range of 0 to 110° C., preferably 30 to 80° C. are generally used. The polymerization is permitted to proceed until the concentration of copolymer in the inert diluent is from about 50 to 180 g./l. The catalysts used in this system are mixtures of a reducing metal containing material and a reducible heavy transition metal compound. The catalysts listed on page 2, line 23 through page 6, line 9 of copending application 725,513 are useful in the present process. The polymerization reaction mixture can be utilized for the halogenating step without isolating the copolymer contained therein. However, it is highly preferred that the catalyst be inactivated or physically removed prior to the halogenation step. Details of the treatment of the polymerization reaction mixture are given on page 7, line 7 through page 8 line 14 of copending application 725,513.

The halogenation reaction is carried out by first adding one or more of the above described inhibiting agents to the reaction mixture and then treating the polymerization reaction mixture with a halogenating agent such as chlorine, bromine, iodine, dichloro dimethylhydantoin, N-bromosuccinimide and the like, with chlorine preferred.

Halogenation conditions can be varied widely and are not critical. In general temperatures of from 0° C. to 150° C. can be used, depending on the activity of the halogenating agent employed. When chlorine is used as the halogenating agent temperatures of from 40° to 150° C., preferably 70° to 120° C. and a reaction time of from about one minute to one hour is utilized. Pressures of from atmospheric to 25 atmospheres are employed. However, pressures above atmospheric are required only when the desired halogenation temperature exceeds the boiling point of the solution at atmospheric pressure. The halogenation reaction can also be carried out in the presence of ultraviolet light which will accelerate the rate of reaction and thus require lower temperatures for better halogen utilization. In general, the quantity of halogenating agent is chosen to produce 2 to 10 times the amount of halogen that reacts with the copolymer, the latter amount being sufficient to provide halogenated copolymers having from 0.5 to 40 wt. percent, preferably 3 to 10 wt. percent halogen therein. Halogenated copolymers containing quantities of halogen outside these limits can also be obtained by the process of the invention, and although not as useful, their preparation is within the scope of the invention.

The inert diluents that are employed in the present process are aliphatic and aromatic hydrocarbons. Halogenated aromatic hydrocarbons can also be used. Examples of useful diluents are n-hexane, n-heptane, n-decane, benzene, chlorobenzene, dichlorobenzenes, and the like. The aromatic hydrocarbons are the preferred diluents for use with the preformed catalysts, which are the preferred catalysts for the present process. Aromatic diluents such as toluene, xylenes, and aromatic compounds having active benzylic hydrogen atoms are not preferred since they react with the halogenating agents. Aromatic diluents which poison the catalysts such as nitrobenzenes, anilines, and phenols cannot be used. Additionally, the inert diluents used herein should be free of catalyst poisons such as oxygen, carbon monoxide, sulfur, and water.

The halogenated copolymer is isolated from the halogenation reaction mixture by one of three techniques; (1) by the addition of an alcohol or a ketone to the reaction mixture to precipitate the halogenated copolymer, (2) by the addition of a chelating agent and an alcohol to the reaction mixture, and (3) by washing the reaction mixture with water followed by removal of most of the diluent by stream stripping. When isolation technique (1) or (2) is used, the precipiated halogenated copolymer is filtered from the liquid portion and dried. When technique (1) is used the alcohol is an aliphatic alcohol having from 1 to 4 carbon atoms per molecule, preferably methanol, and the ketone contains from 3 to 8 carbon atoms per molecule, preferably acetone. From 0.5 to 5, preferably from 1 to 2 volumes of alcohol or ketone is added, based on the volume of the halogenation reaction mixture. When it is desired to insure removal of catalyst residues, technique (2) is used. A small quantity, i.e. from 1 to 3 moles per mole of catalyst, of a chelating agent such as acetyl acetone is added to solubilize the catalyst residues and eliminate them from the precipitated halogenated copolymer. The same quantity of alcohol as in technique (1) is used with the chelating agent to precipitate the halogenated copolymer. Technique (3) has economic and operating advantages over techniques (1) and (2) in that only water is used to isolate the halogenated copolymer and that the inhibiting agents of this invention, which have poisonous effects upon the polymerization catalyst, are removed in the water washing, thus helping to purify the reaction diluent for reuse in the polymerization reaction. This technique involves first washing the halogenation reaction mixture with a large volume of water, e.g. from 1 to 5 volumes based on the volume of the reaction mixture. The inert diluent is then steam stripped off, leaving the halogenated copolymer as a slurry in water, which is then filtered and dried in conventional drying equipment such as tunnel driers, tray driers, and degassing dewatering extruders.

It is of course to be understood that while the halogenation step is preferably carried out without isolating the copolymer from the copolymerization reaction mixture, it is within the broader scope of the invention to isolate the copolymer, dissolve the isolated copolymer in a suitable diluent, and carry out the halogenation reaction of the invention in the resulting solution.

The advantages of carrying out the process of the invention will be apparent from the following examples which are given for illustration purposes and are not meant to limit the invention.

EXAMPLE I

An all glass resin flash system was charged with 6 liters of chlorobenzene and 5.02 g. of an $$Al(C_2H_5)_3/TiCl_3 \cdot 0.2AlCl_3$$

catalyst (Al/Ti ratio=1.34). Ethylene and propylene were passed into the catalyst slurry at 75° C. over a period of 100 minutes. The composition of the gaseous feed was 50 mole percent ethylene-50 mole percent propylene, and copolymerization conditions were so adjusted as to maintain total absorption of the gaseous monomer feed. At the end of copolymerization reaction, 60 ml. of water was added, and the temperature was then maintained at 75° C. for 30 minutes. The temperature of the slurry was next raised to 116–118° C., and maintained for 90 minutes while a nitrogen purge was effected. A colorless, clear, fluid solution resulted. 103 g. of chlorine was then passed through the solution over a period of 32 minutes at a temperature of 116–118° C.

After chlorination the clear, fluid solution was purged with nitrogen and allowed to cool. When the temperature reached 65° C. the chlorinated copolymer solution was added to 5 liters of acetone to precipitate the copolymer. The precipitated copolymer was washed twice with acetone, banded on a cool rubber mill, sheeted out and vacuum oven dried at 60° C. The chlorinated copolymer had the following properties:

| | |
|---|---|
| Weight percent chlorine [1] | 4.6 |
| Inherent viscosity, dl./g. [2] | 1.32 |
| Percent solubles [3] | 82 |
| S.P./M.P., ° C. [4] | <25/<25 |
| Tensile strength, p.s.i. [5] | 420 |
| Elongation, percent [5] | 120 |
| Apparent modulus of elasticity (at −50° C.) [6] | 58,000 |
| Density, g./cc | 0.8914 |
| Percent crystallinity (X-ray) | Ca. 1 |

[1] Dietert determination.
[2] In tetralin at 125° C. at a concentration of 1 g./l.
[3] Determined in toluene at 25° C. at a concentration of 1 g./l. Two day solution period.
[4] On Nalge instrument.
[5] ASTM D—412.
[6] ASTM D—1043.

The above example illustrates the preparation of elastomeric chlorinated ethylene-propylene copolymers in all glass equipment. It shows that essentially no cross-linking occurred during its preparation, the absence of cross-linking being evidenced by the complete solubility of the chlorinated copolymer in tetralin at 125° C. The percent solubles in toluene at 25° C., if interpreted properly, is a semi-quantitative determination of gel content. The chlorinated copolymer in this example had a percent solubles of 82. Since the chlorinated copolymer is still slightly crystalline the rate of solution is relatively low. The chlorinated copolymer that has not dissolved at the end of a two day room temperature solution period is the more crystalline portion. It is not cross-linked since the polymer is totally dissolved in tetralin at 125° C. In instances where the polymer is not soluble in tetralin at 125° C., the percent solubles in toluene at 25° C. is a semi-quantitative measure of gel content.

All percent chlorine, inherent viscosity, and percent soluble values reported hereinafter were determined as above.

EXAMPLE II

Four separate runs were made in a 100 gallon stainless steel reactor. The reactor was charged with 605 pounds of chlorobenzene and an $Al(C_2H_5)_3/TiCl_3 \cdot 0.33AlCl_3$ catalyst at a concentration of 1.0–1.5 g./l. Ethylene and propylene were copolymerized from a 13–23 kg. gaseous feed of approximately 50 mole percent ethylene-50 mole percent propylene at 65–75° C. over a period of 40–60 minutes. After copolymerization water (runs A and B) or methanol (runs C and D) was added to inactivate the catalyst, and the solution was purged with nitrogen for 30 minutes at 65–75° C. The solution was then heated to 115–116° C. for a 90 minute period with continued nitrogen flushing. The copolymer solution remained fluid and clear throughout these operations. To the copolymer solution was then added 2.5–3.2 kg. of chlorine gas at 115°–

116° C. over a 20 minute period. During chlorination the solution remained clear and fluid. After chlorination the resultant solution was purged with nitrogen. During this purging period the solution thickened and darkened and subsequently "set-up," or gelled severely. After isolation by isopropyl alcohol precipitation the chlorinated ethylene-propylene copolymers had the properties shown in Table I. They were dark and tough. They contained substantial amounts of chlorine, but were insoluble in tetralin at 125° C. at a concentration of 1 g./l. showing the presence of "gel" or severely cross-linked copolymer.

*Table I*

|  | Run | | | |
|---|---|---|---|---|
|  | A | B | C | D |
| Catalyst Deactivator | $CH_3OH$ | $CH_3OH$ | $H_2O$ | $H_2O$ |
| Wt. Percent Chlorine | 5.7 | 4.6 | 6.0 | 4.0 |
| Iron Content, p.p.m. | 510 | 510 | (1) | (1) |
| Percent Solubles | 47 | 32 | 31 | 31 |

[1] Iron content not determined.

Since no severe gelation was encountered under similar conditions in all glass equipment (Example I), Example II illustrates the deleterious effects of the metals contained in stainless steel (iron, chromium, nickel, molybdenum are major components generally) or their salts.

EXAMPLE III

A chlorinated ethylene-propylene copolymer, the properties of which are given in Table II was dissolved in chlorobenzene to a concentration of 70 g./l. at 115° C. 5.5 g. of ferric chloride was added per liter of solution (run E). Within one minute after the addition of ferric chloride severe gelation occurred. After isolation the treated chlorinated copolymer had the properties shown in Table II.

Another run, run F, was made identical to run E except that 4.48 g. of hexamethylene tetramine per liter of solution was added with the ferric chloride. Even though ferric chloride was present in sufficient concentration to cause severe chlorinated copolymer gelation, the chlorinated copolymer solution remained fluid throughout a two hour heating period at 115° C. No gelation occurred. After isolation the treated chlorinated copolymer had the properties shown in Table II.

*Table II*

| Run | Original Polymer | E | F |
|---|---|---|---|
| Time to Gel, Min. | | 1 | >120 |
| Inherent Viscosity, dl./g. | 1.01 | Incompletely Soluble. | 0.87 |
| Percent Solubles | 76 | 14 | 59 |
| Wt. Percent Chlorine | 7.5 | 4.9 | 7.6 |

This example clearly illustrates the deleterious effect of ferric chloride upon chlorinated ethylene-propylene copolymers. It further illustrates the marked effectiveness of hexamethylene tetramine in preventing loss of chlorine from, and the gelation of, chlorinated ethylene-propylene copolymers in the presence of ferric chloride.

EXAMPLE IV

A chlorinated ethylene-propylene copolymer having the properties shown in Table III was dissolved in chlorobenzene to a concentration of 70 g./l. In three separate runs 15.4 g. (G), 3.3 g. (H) and 0.2 g. (I) of ferric oxide were added per liter of solution at 115° C. In each case severe gel occurred as shown in Table III. As little as 1 part of ferric oxide per 350 parts of the chlorinated ethylene-propylene copolymer gave severe gel. The properties of these treated chlorinated copolymers after isolation are given in Table III. These runs aptly demonstrate the ability of ferric oxide to cross-link, or gel, chlorinated ethylene propylene copolymers.

Three runs were made in which 3.3 g. of ferric oxide was added per liter of solution along with 2.90 g. hexamethylene tetramine (J), 3.28 g. triethanol amine (K) and 4.00 g. triethyl phosphate (L) at 115° C. All three of the solutions remained fluid throughout a two hour heating period at 115° C. No gelation occurred. After isolation the treated chlorinated copolymer had the properties shown in Table III.

These runs illustrate the effectiveness with which hexamethylene tetramine, triethanol amine and triethyl phosphate inhibit the cross-linking of chlorinated ethylene-propylene copolymers by ferric oxide and the loss of chlorine in the copolymer.

*Table III*

| Run | Original Polymer | G | H | I | J | K | L |
|---|---|---|---|---|---|---|---|
| $Fe_2O_3$: g./70 g. Copolymer | | 15.4 | 3.3 | 0.2 | 3.3 | 3.3 | 3.3 |
| Anti-Gel Agent—g./70 g. Copolymer: | | | | | | | |
| Hexamethylene tetramine | | | | | 2.90 | | |
| Triethanol amine | | | | | | 3.28 | |
| Triethyl phosphate | | | | | | | 4.00 |
| Gel | | Yes | Yes | Yes | No | No | No |
| Time to Gel, Min. | | 1 | 2 | ca. 30 | >120 | >120 | >120 |
| Inherent Viscosity, dl./g. | 1.01 | | | (1) | 1.12 | 1.00 | 0.92 |
| Percent Solubles | 76 | | | 22 | 46 | 53 | 68 |
| Wt. Percent Chlorine | 7.5 | | | 5.9 | 6.8 | 6.6 | 6.6 |

[1] Incompletely soluble.

EXAMPLE V

*Run M.*—A chlorinated ethylene-propylene copolymer having the properties shown in Table IV was dissolved in chlorobenzene to a concentration of 70 g./l. To this solution at 115° C. was added 3.3 g. of ferric oxide per liter of solution. Severe gelation occurred in 15 minutes. The properties of the isolated copolymer are given in Table IV.

*Run N.*—In an identical run 3.3 g. of ferric oxide and 1.74 g. of pyridine were added to one liter of chlorinated copolymer solution at 115° C. No gelation occurred. The solution remained fluid throughout a two hour heating period at 115° C. After isolation the treated chlorinated copolymer had the properties shown in Table IV.

*Table IV*

| Run | Original Polymer | M | N |
|---|---|---|---|
| Time to Gel, Min. | | 15 | >120 |
| Inherent Viscosity, dl./g. | 1.19 | (1) | 1.54 |
| Percent Solubles | 66 | 17 | 59 |
| Wt. percent Chlorine | 7.0 | 4.7 | 6.6 |

[1] Incompletely soluble.

This example illustrates the effectiveness of pyridine in preventing gelation of, and chlorine loss from, chlorinated ethylene-propylene copolymers in the presence of ferric oxide.

EXAMPLE VI

In runs O, P and Q, 2.3 g., 0.5 g., and 0.1 g. respectively of iron powder were added to 1 liter chlorobenzene solutions of 70 g. of an ethylene-propylene copolymer having the properties given in Table V. Chlorination was conducted under the conditions given in Table V. After chlorination, severe gelation of the resultant chlorinated copolymers occurred, the rapidity of gelation being proportional to the iron powder concentration. The chlorinated copolymers were isolated by mixing with isopropyl alcohol in a Waring Blendor, decanting the polymer from the remaining iron powder and mother liquor, soaking the polymer in 1.2 N hydrochloric acid, washing with water and then acetone and oven drying. After isolation, the chlorinated copolymers had the properties shown in Table V.

Table V shows the adverse effect of iron on chlorinated copolymers when present during chlorination. The higher the iron content, the worse are the chlorinated copolymer properties, i.e., the lower is the chlorine content and the higher is the gel content.

It should be noted that as little as one part of iron powder per 700 parts of ethylene-propylene copolymer severely gels the chlorinated copolymer. Of course, because of the insolubility of iron, the effective iron concentration is considerably less.

In another set of four runs 2.3 g. of iron powder was added to a solution of 70 g. of copolymer (described in Table V) in one liter of chlorobenzene along with 2.9 g. of hexamethylene tetramine (run R), 4.0 g. of triethyl phosphate (run S) 1.74 g. of pyridine (run T) and 3.28 g. of triethanol amine (run U). These solutions were chlorinated at 115° C. details of which are given in Table V. The solutions remained fluid during chlorination. After chlorination nitrogen was passed through the solutions, and the solutions were permitted to cool to room temperature. During this period the solutions also remained fluid, and no gelation occurred. The chlorinated copolymers were isolated by isopropyl alcohol precipitation, the polymer crumbs decanted from the remaining iron powder and the mother liquor, washed with 1.2 N hydrochloric acid, water and acetone and vacuum oven dried. The isolated chlorinated copolymers had the properties shown in Table V.

This example dramatically illustrates the effectiveness of hexamethylene tetramine, triethyl phosphate, pyridine and triethanol amine in preventing cross-linking of the chlorinated copolymer and in improving chlorine utilization in the presence of iron metal under the conditions of chlorination, i.e., at high temperature and in the presence of free HCl and $Cl_2$.

Table V

| Run | Original Co-polymer | O | P | Q | R | S | T | U |
|---|---|---|---|---|---|---|---|---|
| Iron Powder Used, g | | 2.3 | 0.5 | 0.1 | 2.3 | 2.3 | 2.3 | 2.3 |
| Anti-Gel Agent: Wt., g | | | | | | | | |
| Hexamethylene tetramine | | | | | 2.9 | | | |
| Triethyl phosphate | | | | | | 4.0 | | |
| Pyridine | | | | | | | 1.74 | |
| Triethanol amine | | | | | | | | 3.28 |
| Chlorine Used, g | | 19 | 20 | 20 | 20 | 21 | 19 | 19 |
| Chlorination: Temperature, °C | | 115-117 | 113-115 | 114-115 | 113-117 | 113-115 | 114-116 | 114-116 |
| Time, Min | | 20 | 20 | 20 | 20 | 20 | 20 | 20 |
| Gelation: Minutes after Chlorination | | 3 | 7 | ca.20 | none | none | none | none |
| Polymer Properties: Inherent Viscosity | 1.63 | (¹) | (¹) | (¹) | 1.56 | 1.56 | 1.50 | 1.61 |
| Percent Solubles | 74 | 18 | 28 | 35 | 75 | 80 | 90 | 93 |
| Percent Chlorine | 0.4 | 3.8 | 6.7 | 6.3 | 9.6 | 12.7 | 7.1 | 9.6 |

¹ Incompletely soluble.

It should be noted that thermal soaking alone, even at 115° C. for four hours, did not cause gelation or adversely affect the properties of the products.

Variations in the above halogenation process can be made without departing from the scope and spirit of the invention. For example, the process of the invention can also be used to prevent gelation in the halogenation of homopolymers of alpha olefins, such as polyethylene and polypropylene.

What is claimed is:
1. In a process for preparing a halogenated copolymer of ethylene and a higher alpha olefin comprising halogenating a copolymer of ethylene and propylene in the presence of an iron-containing material with a halogenating agent selected from the group consisting of chlorine, bromine, iodine, fluorine, dichloro dimethylhydantoin and N-bromo-succinimide at a temperature of 0° C. to 150° C. in an inert hydrocarbon diluent at a pressure of from atmospheric to 25 atmospheres; the copolymer of ethylene and propylene having been prepared from 40 to 60 mole percent ethylene and from 60 to 40 mole percent propylene in contact with the low pressure polymerization catalyst comprising a mixture of a reducing metal containing material and a reducible heavy transition metal compound, the improvement of preventing product degradation comprising adding from 0.1-6 g./l. of polymer solution of triethyl phosphate to the copolymer dissolved in an inert hydrocarbon diluent prior to the halogenation reaction.
2. The process of claim 1 wherein the inert hydrocarbon diluent is chlorobenzene.

References Cited in the file of this patent

UNITED STATES PATENTS

| | | |
|---|---|---|
| 2,327,517 | Frolich et al. | Aug. 24, 1943 |
| 2,405,971 | McAlvey | Aug. 20, 1946 |
| 2,885,377 | Knowles et al. | May 5, 1959 |